3,243,396
COATING COMPOSITIONS CONTAINING WAXES, POLYETHYLENE, POLYPROPYLENE, AND A POLYTERPENE RESIN
Irving P. Hammer, Nutley, N.J., assignor to Socony Mobil Oil Company, Inc., a corporation of New York
No Drawing. Filed Apr. 6, 1962, Ser. No. 185,515
5 Claims. (Cl. 260—28.5)

This invention is directed to an improved plastic formulation for coating paper, cardboard, kraft board, cartons and the like and is particularly concerned with a coating composition for use in coating fibrous board useful as a container for liquids and solids.

It is current practice to package many items in paper and cartons, such as bacon, butter, margarine, milk and orange juice. In order to provide a leakproof container for these items, the package is presently coated with a layer of paraffin wax. It is well recognized that wax has outstanding resistance to water vapor transfer provided the wax coating is not disturbed. Unfortunately, however, paraffin wax is very friable and, hence, the wax cracks under any substantial deformation. Cracks develop in the wax coating at the creases formed when the package is assembled and, unfortunately, the vapor transfer through the cracks is high.

Continuous efforts have been made through the years to improve wax formulations by refinery treatment and blending. Microcrystalline wax has been added to the paraffin wax to make the wax more ductile and less liable to rupture. Rubber, oil and lower melting waxes, such as foots wax, have been added for the same purpose. All these addition agents help, but they tend to soften the wax, giving it a dull appearance, a greasy feel and making it easy to mar or smear. The coating formed, therefore, is a soft, tacky or greasy coating. This coating is suitable for use as a laminating or intermediate coating between plies but the coating does not produce a decorative package.

An alternate approach to this problem has been to add various materials to the wax to toughen the wax. The toughened wax film would then require a greater force to rupture the film. Fischer-Tropsch wax, polyethylene, polybutylene and polyvinyls have been added for this purpose. A tougher coating with a higher permeability to moisture vapor transfer than paraffin wax is provided with these additions. However, the coating composition is made more brittle by the addition and hence the cracks are again formed with rough handling causing a loss of vapor seal at the creases of the package.

It is an object of this invention to provide an improved coating formulation for paper and carton board.

A further object of this invention is to provide an improved coating for cartons and paperboard containers.

A further object of this invention is to provide an improved coating formulation for application to paper, milk cartons, bacon wrappers and juice containers which will not crack, flake or rub-off and which has a non-greasy feel, accompanied with a high gloss.

A further object of this invention is to provide a coating composition for paperboard having high hardness, superior water vapor transfer resistance, good flexibility, good gloss, freedom from frosting or exudation, high ductility, plastic feel and excellent appearance.

These and other objects of this invention will be more fully disclosed in the following more detailed description of the invention.

This invention comprises a mixture in critical amounts of solid polyethylene, solid polypropylene and petroleum wax. The formulation broadly contains about 10–40 percent by weight of the two polymers with ratio of polyethylene to polypropylene varying between 2:1 and 1:2. While excellent coating compositions can be obtained with these three ingredients, additional materials may be added or may be desirable in some instances. Various resins can be added to provide improvement. These resins will be disclosed in more detail hereinafter. Antioxidants can also be added as required without interfering with the operation of the primary ingredients.

It is necessary to use a substantial amount of the two solid polymers to obtain the type of coating here desired. For example, at least about 10% by weight of the mixture should be the two solid polymers and preferably the two solid polymers should comprise about 20% by weight of the total composition. The critical element involved in this invention, however, is the ratio of polyethylene to polypropylene. The ratio must be within the limits of 2:1 and 1:2 with the preferred ratio being 1:1.

The molecular weight of the polyethylene should be about 5,000 to 100,000 (Staudinger). However, the preferred range is about 15,000 to 35,000. The polypropylene is preferably the isotactic or stereoregular variety. In view of viscosity considerations, it is preferred to use the low molecular weight polypropylenes, such as 50,000 to 100,000, although in situations where viscosity is less of a factor, the higher molecular weight polypropylenes, such as 100,000–400,000 molecular weight, can be used successfully. A particularly suitable polyethylene has a molecular weight of 25,000, a melt index of about 3 and a density of 0.918. A particularly suitable polypropylene has a molecular weight of about 80,000 with a flow rate at 230° C. of 18.

As the polyethylene content is increased within the critical range, increasing hardness is noted as well as an improvement in gloss. Beyond the prescribed limit, the formulation becomes too hard and brittle. Flexibility is inadequate for the usual coating purpose. On the other hand, increasing the polypropylene content shows an increase in the flexibility of the composition. The coated boards can be bent back on themselves many times without developing fissures or cracks in the coating. If the limit of polypropylene is exceeded, however, the surface hardness is badly reduced and the coating is easily marred. The coating becomes quite waxy or greasy and is deficient in gloss.

The general formula will, therefore, be as follows:

| | Percent by wt. |
|---|---|
| Wax phase | 90–60 |
| Polyethylene | 5–20 |
| Polypropylene | 5–20 |

It is possible to add certain natural resins to provide additional improvement to the coatings. These resinous materials serve as a hardening agent and improve the adhesion of the coating to the paperboard. These resins are compatible with the waxes and include wood rosin, copal, polymerized rosins, hydrogenated rosins, as well as ester gums of natural or modified rosins. The natural hydrocarbon resins, such as terpene polymers, supplied by Neville Product Company under the trade name "Nypene," or as supplied by the Pennsylvania Industrial Chemical Company under the trade name "Piccolyte" are particularly useful for this purpose. In these formulations the formula range will be:

| | Percent by wt. |
|---|---|
| Wax phase | 83–59 |
| Polyethylene | 5–20 |
| Polypropylene | 5–20 |
| Natural resin | 7–1 |

The effect of varying the ratio of polyethylene to polypropylene on the finished blend is illustrated in Table I hereinbelow. In these examples the wax and natural hydrocarbon resin phases were kept constant while varying the polyethylene to polypropylene ratio. Samples of dairy board were then dip-coated, water quenched and then examined for overall appearance, feel and flex.

TABLE I

| Run No. | 1 | 2 | 3 | 4 | 5 | 6 | 7 |
|---|---|---|---|---|---|---|---|
| Paraffin 133/135° F. AMP Wax | 63.3 | 63.3 | 63.3 | 63.3 | 63.3 | 63.3 | 63.3 |
| Microcrystalline 165-170° F. AMP Wax | 13.7 | 13.7 | 13.7 | 13.7 | 13.7 | 13.7 | 13.7 |
| Polypropylene (MW 80,000) | 18.0 | 15.0 | 12.0 | 9.0 | 6.0 | 3.0 | 0 |
| Polyethylene (MW 25,000) | 0 | 3.0 | 6.0 | 9.0 | 12.0 | 15.0 | 18.0 |
| Natural resin (Piccolyte) | 5.0 | 5.0 | 5.0 | 5.0 | 5.0 | 5.0 | 5.0 |
| Film Properties: | | | | | | | |
| Feel | Greasy | Trace Greasy | Dry | Dry | Dry | Dry | Dry |
| Flex | 20+ | 20+ | 8 | 7 | 6 | 2 | 1 |

The flex test was run by subjecting coated panels to a flex of 150° at the score line by bending over a mandril. The flexed portion was then returned to the horizontal, and the flexing process repeated. The numbers listed refer to the number of flexes possible before the film breaks. Evidence of film break was obtained by immersing the flexed board in a 10% iodine solution for 2 minutes. A blue stain appears in the substrate at the point of break. The runs 3, 4 and 5 were found satisfactory for both flex and feel. These coatings were outstanding in every respect. The coatings of runs 1 and 2 were not satisfactory in feel, gloss and resistance to marring. The coatings of runs 6 and 7 were deficient from a flex standpoint and hence water vapor transfer at the broken crease would be considered excessive.

In addition to good flex and feel, the formulations illustrated in runs 3, 4 and 5 have moderate working viscosity (moderate viscosities being those below 10,000 centipoises at 325° F.), excellent gloss, and excellent non-scuff characteristics.

While the primary area of utility for the product of this invention is in the coating field, it can also be used in various molding applications. Low cost molded articles, such as tomato baskets, soap dishes, strawberry cartons, etc. can be prepared from the composition of this invention.

A series of blends was prepared using varying amounts of ingredients to find the optimum blend. These results are reported in Table II as follows:

Referring to the results shown in Table II, the run No. 11 shows a good combination of gloss and flexibility with a limited amount of natural resin. Run No. 12 shows the improvement to be obtained by adding additional natural resin. Run No. 13 shows the benefit obtained by increasing the microcrystalline wax content. Runs 14 and 15 show the effect of reducing the polypropylene content down to and below the critical limit. The flexibility drops markedly with reduction of polypropylene. Run No. 16 shows fine flexibility and gloss. Furthermore, this coating has a harder surface obtained from the reduction of the microcrystalline wax content. The best result was obtained with the composition of run No. 17. Here the polyethylene and polypropylene concentration was the same and a high melting point ceresin wax was used in place of the normal microcrystalline wax. The coating was excellent from the standpoint of hardness, gloss and flexibility as well as clarity and freedom from frosting.

*Example 1*

As an illustration of this invention a composition was blended using the following ingredients and amounts:

| | Percent by wt. |
|---|---|
| 133/135° F. AMP paraffin wax | 57 |
| 165° F. AMP microscrystalline wax | 10 |
| 195° F. AMP high-melt ceresin wax | 10 |
| Solid polypropylene resin (Tenite 4252) | 9 |
| Solid polyethylene resin (Tenite 859E) | 9 |
| Solid terpene polymer (Piccolyte S-115-L) | 5 |
| | 100 |

TABLE II.—WAX-POLYETHYLENE— POLYPROPYLENE BLENDS

| Run No. | 11 | 12 | 13 | 14 | 15 | 16 | 17 |
|---|---|---|---|---|---|---|---|
| Paraffin 133/135° F. AMP Wax | 66.3 | 66.3 | 55.0 | 66.3 | 66.3 | 57.0 | 57.0 |
| Microcrystalline 165/170°F. AMP Wax | 13.7 | 13.7 | 25.0 | 13.7 | 13.7 | 20.0 | 10 |
| Ceresin Wax (195° F. AMP) | | | | | | | 10 |
| Polyethylene (MW 25,000) | 9.0 | 9.0 | 9.0 | 12.0 | 15.0 | 9.0 | 9.0 |
| Polypropylene (MW 80,000) | 9.0 | 9.0 | 9.0 | 6.0 | 3.0 | 9.0 | 9.0 |
| Natural Resin (Piccolyte S-115-L) | 2.0 | 5.0 | 2.0 | 2.0 | 2.0 | 5.0 | 5.0 |
| Antioxidant (Santonox R) [Added to final blend] | 0.05 | 0.05 | 0.05 | 0.05 | 0.05 | 0.05 | 0.05 |
| Viscosity at 325° F., Centipoises | 605 | 550 | 550 | 540 | 315 | 670 | 555 |
| Properties of Applied Film: | | | | | | | |
| Gloss | Good | Very Good | Very Good | Good | Good | Very Good | Excellent |
| Flex | 10 | 21+ | 18 | 4 | 2 | 21+ | 21+ |

Referring to Table II, the high melting point ceresin wax was a wax identified as wax No. 195-M, sold by the Sonneborn Chemical Company and possessed the following properties:

| | |
|---|---|
| Melting point ° F., D127 (ASTM) | 190–200 |
| Needle penetration at 77° F., max. | 10 |
| Color | 11 |
| Viscosity at 210° F., SUS | 78–88 |
| Oil content, percent | 0.5 |

An anti-oxidant (Santonox R) was added in the amount of 0.05% of the mixture. The blend was thoroughly mixed with the solids in melted condition and the composition had the following characteristics:

| | |
|---|---|
| Softening point, ° F. | 245 |
| Visc. Brookfield cps. at 325° F. | 555 |
| Color, ASTM | 1.5 |
| Needle Pen. at 77° F. | 11.0 |

| | |
|---|---|
| at 100° F. | 28.5 |
| at 115° F. | 48.5 |

Using a hand dipping operation, this composition was applied to carton board, some of which had been imprinted. The coated board was quick chilled in a cold water bath producing a fine clear coating with excellent gloss. The gloss retention after 24 hours was still excellent. The surface was hard and difficult to mar or scratch. The board was folded back on itself over 21 times without showing fissures or cracks.

*Example 2*

A board was hand coated with solid polyethylene. The coating was hard and mar resistant with adequate flexibility. The gloss was not as satisfactory as the gloss of the coating of the composition of Example 1.

*Example 3*

A board was hand coated with a mixture of petroleum wax and a copolymer of ethylene and vinyl acetate (80% wax–20% copolymer). The gloss was excellent immediately after application. However, the gloss retention was poor—frosting appeared within 24 hours after the coating was applied. Flexibility was good but the coating was not mar resistant. This coating was inferior to the coating of Example 1.

The invention has been adequately illustrated by the examples given hereinabove. These examples were presented only to demonstrate the invention and are not intended as limitations of the invention. The only limitations intended are found in the attached claims.

I claim:
1. A plastic composition for coating milk containers and similar articles comprising: about 57% by weight 110–150° F. AMP paraffin wax, about 10% by weight 150–175° F. AMP microcrystalline wax, about 10% by weight 175–200° F. AMP ceresin wax, about 9% by weight solid polyethylene resin, about 9% by weight solid isotactic polypropylene resin, and about 5% by weight solid polyterpene resin.

2. A plastic composition defined by claim 1 wherein said polyethylene has a molecular weight of about 25,000 and wherein said polypropylene has a molecular weight of about 80,000.

3. A plastic composition for coating milk containers and similar articles comprising: about 83–59% by weight petroleum wax consisting essentially of a mixture of paraffin wax and microcrystalline wax in a weight ratio from about 55/25 to about 57/10, about 5–20% by weight solid polyethylene, about 5–20% by weight solid isotactic polypropylene, the ratio of polyethylene to polypropylene being between about 2:1 and about 1:2, and about 1–7% by weight of solid polyterpene resin.

4. A plastic composition defined by claim 3 wherein said polyethylene has a molecular weight between about 15,000 and about 35,000, and wherein said polypropylene has a molecular weight between about 50,000 and about 100,000.

5. A plastic composition defined by claim 3 wherein the ratio of polyethylene to polypropylene is about 1:1.

References Cited by the Examiner

UNITED STATES PATENTS

| | | | |
|---|---|---|---|
| 2,453,644 | 11/1948 | Steinkraus | 260—28.5 |
| 2,728,735 | 12/1955 | Anderson | 260—28.5 |
| 3,042,640 | 7/1962 | Gersic et al. | 260—28.5 |
| 3,048,551 | 8/1962 | Lutz. | |

FOREIGN PATENTS

| | | |
|---|---|---|
| 620,375 | 5/1961 | Canada. |
| 626,733 | 9/1961 | Canada. |

ALEXANDER H. BRODMERKEL, *Primary Examiner.*

MORRIS LIEBMAN, J. W. BEHRINGER, B. A. AMERNICK, *Assistant Examiners.*